(12) United States Patent
Brooks et al.

(10) Patent No.: US 7,478,225 B1
(45) Date of Patent: Jan. 13, 2009

(54) APPARATUS AND METHOD TO SUPPORT PIPELINING OF DIFFERING-LATENCY INSTRUCTIONS IN A MULTITHREADED PROCESSOR

(75) Inventors: Jeffrey S. Brooks, Austin, TX (US); Christopher H. Olson, Austin, TX (US); Robert T. Golla, Round Rock, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 562 days.

(21) Appl. No.: 10/881,071

(22) Filed: Jun. 30, 2004

(51) Int. Cl.
  *G06F 9/30* (2006.01)
(52) U.S. Cl. .................................................... 712/214
(58) Field of Classification Search ............... 712/214
  See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,604,878 A * | 2/1997 | Colwell et al. | 712/217 |
| 5,619,439 A | 4/1997 | Yu et al. | |
| 5,842,036 A * | 11/1998 | Hinton et al. | 712/23 |
| 5,954,789 A | 9/1999 | Yu et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,212,629 B1 * | 4/2001 | McFarland et al. | 712/241 |
| 6,260,133 B1 * | 7/2001 | Teruyama | 712/209 |
| 6,282,554 B1 | 8/2001 | Abdallah et al. | |

(Continued)

OTHER PUBLICATIONS

Tulsen et al., "Power-sensitive multithreaded architecture," IEEE 2000, pp. 199-206.

(Continued)

*Primary Examiner*—Eddie P Chan
*Assistant Examiner*—Jacob Petranek
(74) *Attorney, Agent, or Firm*—Robert C. Kowert; Anthony M. Petro; Meyertons, Hood, Kivlin, Kowert & Goetzel, P.C.

(57) ABSTRACT

An apparatus and method to support pipelining of variable-latency instructions in a multithreaded processor. In one embodiment, a processor may include instruction fetch logic configured to issue a first and a second instruction from different ones of a plurality of threads during successive cycles. The processor may also include first and second execution units respectively configured to execute shorter-latency and longer-latency instructions and to respectively write shorter-latency or longer-latency instruction results to a result write port during a first or second writeback stage. The first writeback stage may occur a fewer number of cycles after instruction issue than the second writeback stage. The instruction fetch logic may be further configured to guarantee result write port access by the second execution unit during the second writeback stage by preventing the shorter-latency instruction from issuing during a cycle for which the first writeback stage collides with the second writeback stage.

18 Claims, 8 Drawing Sheets

U.S. PATENT DOCUMENTS

| | | | |
|---|---|---|---|
| 6,295,600 B1 * | 9/2001 | Parady | ........................ 712/228 |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,704,855 B1 * | 3/2004 | Altman et al. | .............. 712/210 |
| 6,728,845 B2 | 4/2004 | Adiletta et al. | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 7,117,345 B2 * | 10/2006 | Janik et al. | .................. 712/219 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

*FIG. 3*

|  | 0 | 1 | 2 | 3 | 4 | 5 | 6 | 7 | 8 |
|---|---|---|---|---|---|---|---|---|---|
| Pick (P) | LL | | | SL | | | | | |
| Decode (D) | | LL | | | SL | | | | |
| Execute (E) | | | LL | | | SL | | | |
| FX1/Memory (M) | | | | LL | | bubble | SL | | |
| FX2/Bypass (B) | | | | | LL | | bubble | SL | |
| FX3/ Writeback (W) | | | | | | LL | | bubble | SL |
| FX4 | | | | | | | LL | | |
| FX5 | | | | | | | | LL | |
| LL Writeback | | | | | | | | | LL |

Execution cycle

No write port conflict

FIG. 6

APPARATUS AND METHOD TO SUPPORT PIPELINING OF DIFFERING-LATENCY INSTRUCTIONS IN A MULTITHREADED PROCESSOR

BACKGROUND OF THE INVENTION

1. Field of the Invention

This invention relates to processors and, more particularly, to scheduling and coordination of instruction execution within a processor.

2. Description of the Related Art

In some pipelined processor embodiments implementing a given instruction set architecture (ISA), different instructions may be configured to execute with different latencies according to their relative complexity. For example, multiplication instructions may execute in a greater number of execution cycles than add instructions. In some such embodiments, two instructions that begin execution in two different execution cycles may complete execution and produce a result to be written back (for example, to a register file) during the same execution cycle.

Providing a dedicated write port for each instruction of differing latency may be expensive in terms of design effort, manufacturing cost, and processor performance, as additional write ports typically require increased processor die area, which may in turn reduce usable die per wafer and lengthen critical circuits. Further, if a write conflict between differing-latency instructions is relatively rare, dedicated write ports may be poorly utilized.

On the other hand, requiring differing-latency instructions to arbitrate for a write port may also increase design complexity and impact performance. For example, if a given instruction loses arbitration and cannot write back during a given execution cycle, its result may need to be queued for another arbitration attempt, or execution may stall until writeback can proceed. Additionally, if an arbitration algorithm is not designed and verified to be fair, performance of certain types of instructions could suffer. In the worst case, a livelock or deadlock condition could arise if a given instruction is queued or stalled indefinitely while waiting for writeback.

SUMMARY

Various embodiments of an apparatus and method to support pipelining of variable-latency instructions in a multithreaded processor are disclosed. In one embodiment, a processor may include instruction fetch logic configured to issue a first instruction from one of a plurality of threads during one execution cycle and to issue a second instruction from another one of the plurality of threads during a successive execution cycle. The processor may also include a first execution unit configured to execute a shorter-latency instruction and to write a result of the shorter-latency instruction to a result write port during a first writeback stage that occurs a first number of execution cycles after issue of the shorter-latency instruction, and a second execution unit configured to execute a longer-latency instruction and to write a result of the longer-latency instruction to the result write port during a second writeback stage that occurs a second number of execution cycles after issue of the longer-latency instruction, where the second number is greater than the first number. The instruction fetch logic may be further configured to guarantee access by the second execution unit to the result write port during the second writeback stage by preventing issue to the first execution unit of the shorter-latency instruction during an execution cycle for which the first writeback stage collides with the second writeback stage.

A method is further contemplated that in one embodiment may include issuing a first instruction from one of a plurality of threads during one execution cycle, issuing a second instruction from another one of the plurality of threads during a successive execution cycle, writing a result of a shorter-latency instruction to a result write port during a first writeback stage that occurs a first number of execution cycles after issuing the shorter-latency instruction, and writing a result of a longer-latency instruction to the result write port during a second writeback stage that occurs a second number of execution cycles after issuing the longer-latency instruction, where the second number is greater than the first number. The method may further include preventing issue of the shorter-latency instruction during an execution cycle for which the first writeback stage collides with the second writeback stage.

BRIEF DESCRIPTION OF THE DRAWINGS

FIG. 3 is a pipeline diagram illustrating the flow of instructions through one embodiment of a processor core.

FIG. 6 is a pipeline diagram illustrating one embodiment of bubble insertion to prevent a write hazard.

Figure 1:
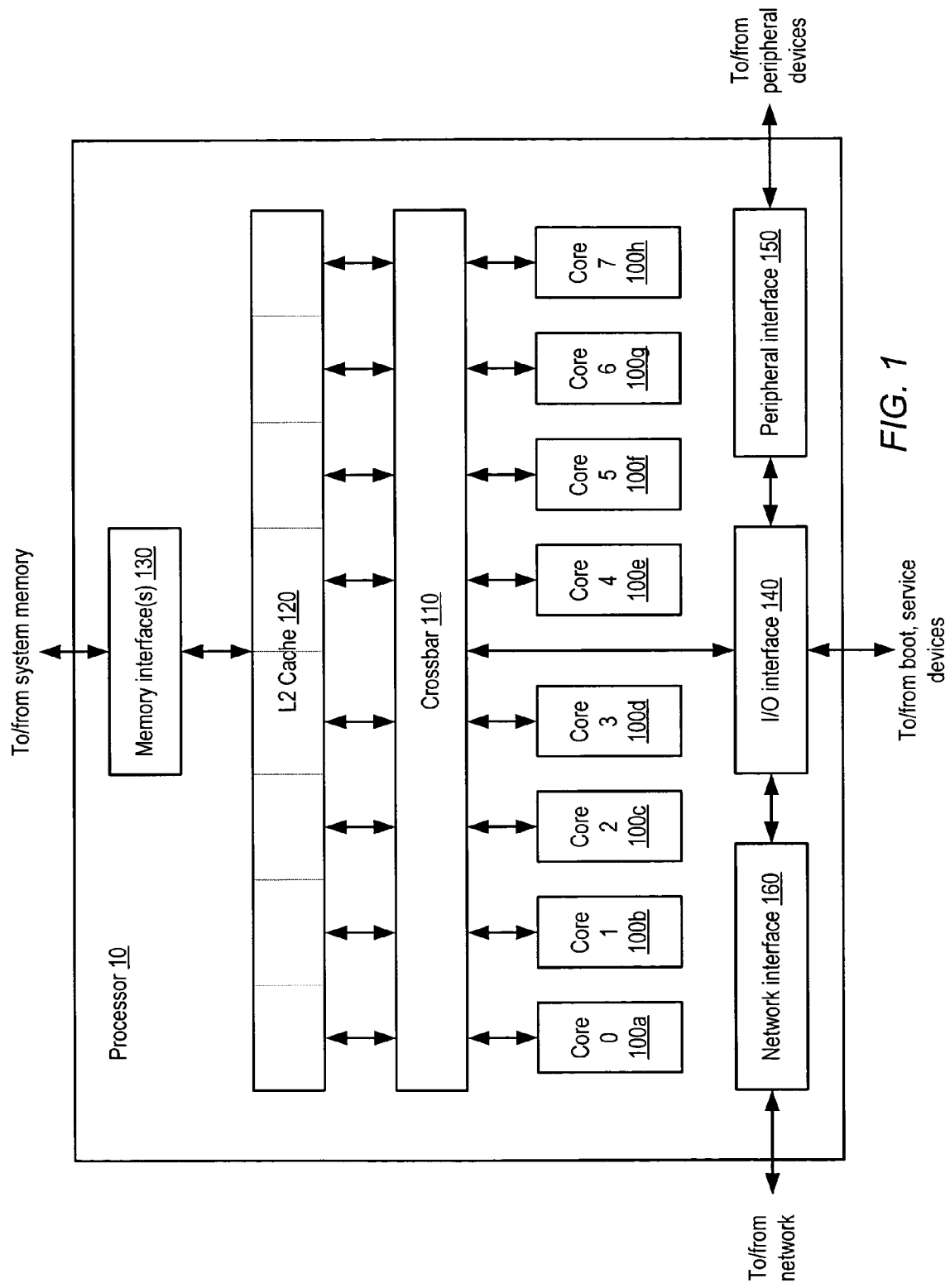
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
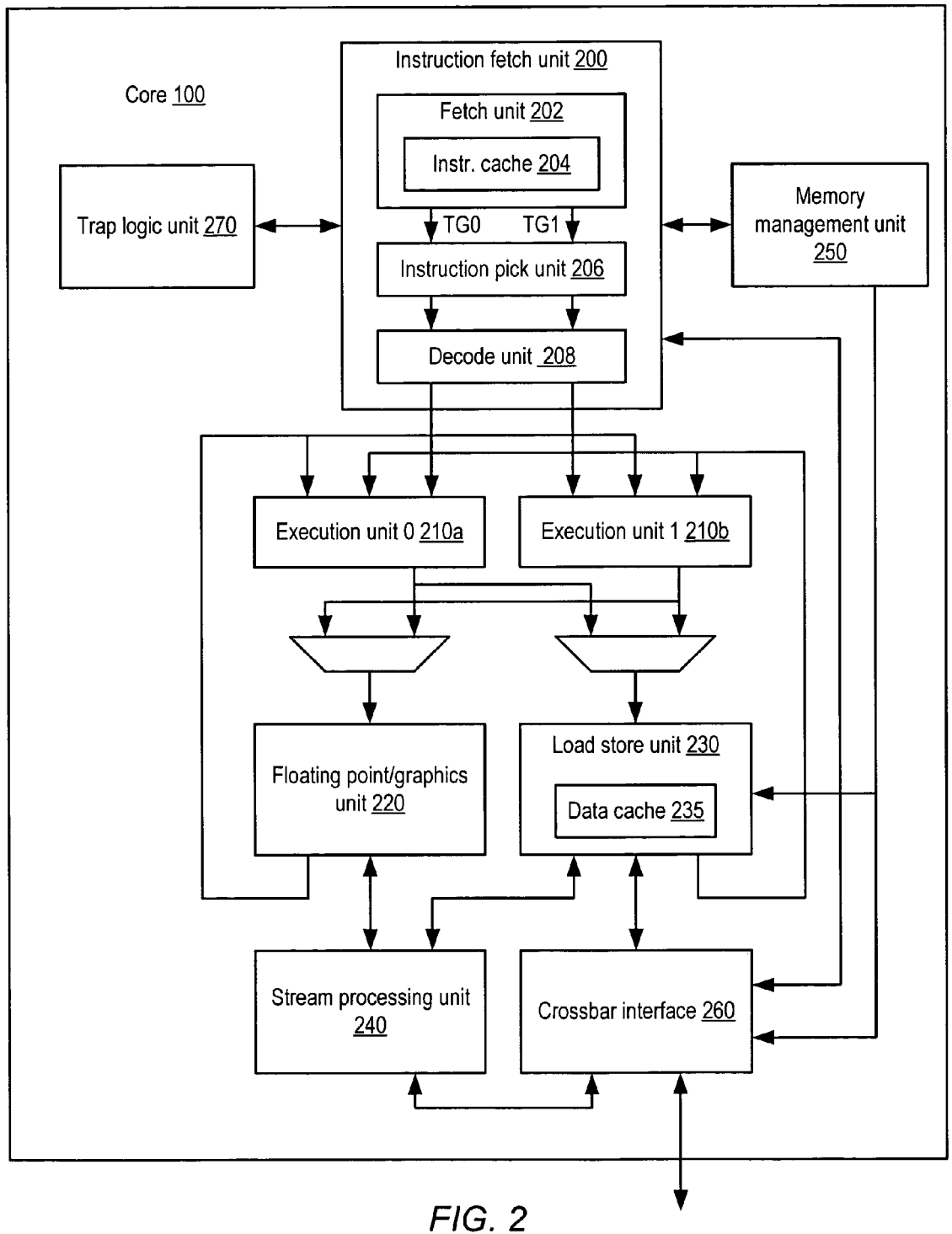
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Longer-Latency Integer Instruction Execution

In some instruction set architectures, certain instructions may be more difficult to implement within a given area or time constraint than other instructions. Such more-difficult instructions may be said to be more complex than other instructions. For example, integer multiplication is generally more complex than integer addition. Similarly, an integer population count (i.e., counting the number of asserted or deasserted bits of an operand) is generally more complex than an integer shift. In one pipelined implementation of a given ISA, all instructions may be configured to execute in the same number of execution cycles. However, this approach may penalize less-complex instructions and/or require substantial device area to speed execution of more-complex instructions.

In one embodiment of a fine-grained multithreaded processor core such as core 100, one execution unit may be configured to execute less complex instructions with a shorter latency, while another execution unit may be configured to execute more complex instructions with a longer latency. For example, in one embodiment a first execution unit may be configured to implement integer instructions such as addition, subtraction, shift and Boolean instructions in a single execution cycle, while a second execution unit may be configured to implement integer multiplication, integer multiply step, and integer population count instructions in multiple execution cycles. In one such embodiment, the more complex instructions implemented in the second execution unit may be configured to share logic provided for other instructions. For example, the second execution unit may be a floating-point execution unit including a floating-point multiplier that also may be configured to execute integer multiply instructions, thus saving the area that would be required for a dedicated integer multiplier. It is contemplated that in other embodiments, any suitable division between shorter-latency instructions and longer-latency instructions may be made among any suitable configuration of execution units. For example, floating-point instructions may be divided among execution units by latency, or instructions may be grouped on a basis other than integer or floating-point data types. Further, it is contemplated that in some embodiments, instructions may be divided into more than two different latency groups.

Figure 4:
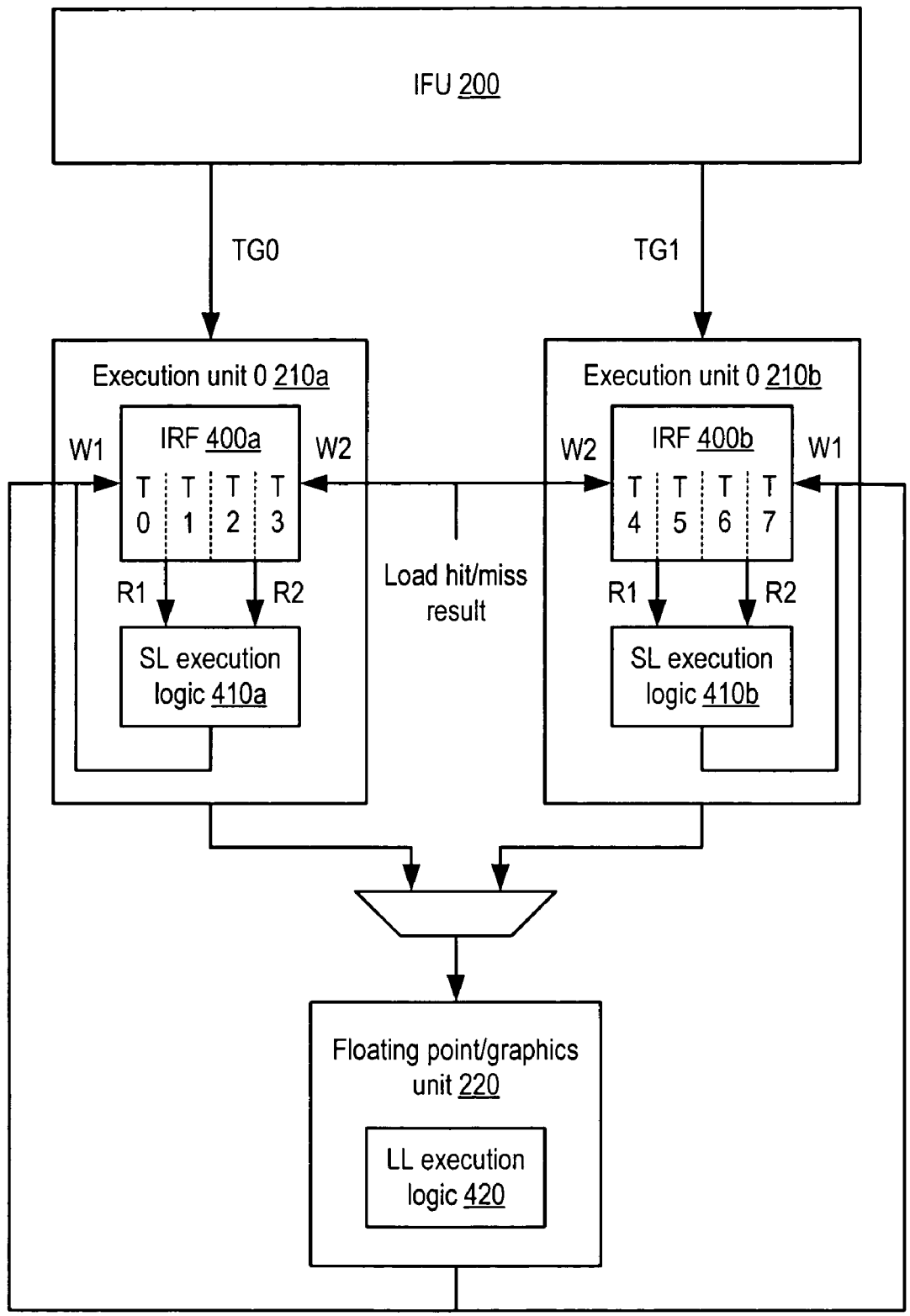
FIG. 4 is a block diagram illustrating one embodiment of a processor core configured to execute longer-latency instructions in a different execution unit than shorter-latency instructions.

One embodiment of core 100 configured to execute longer-latency integer instructions in a different execution unit than shorter-latency integer instructions is illustrated in FIG. 4. In the illustrated embodiment, only IFU 200, execution units 210, and FGU 220 are shown for clarity, although it is understood that core 100 may also include other elements such as previously described. In the illustrated embodiment, each of execution units 210a-b includes a respective integer register file (IRF) 400a-b as well as respective shorter-latency (SL) execution logic 410a-b. Additionally, FGU 220 includes longer-latency (LL) execution logic 420.

As described above, each of EXUs 210 may be bound to a respective thread group TG0 or TG1 and configured to execute instructions corresponding to a thread included in its respective thread group. In the illustrated embodiment, each of IRFs 400a-b may be configured to store register state corresponding to the threads included in its respective thread group. For example, where TG0 includes four threads 0-3, IRF 400a may be configured to store a unique set of registers for each of threads 0-3. Similarly, IRF 400b may store a unique set of registers for each of threads 4-7 of TG1. In other embodiments, it is contemplated that a different number of threads may be provided, and those threads may be partitioned differently among a different number of thread groups. Further, it is contemplated that a different number of EXUs 210 may be provided and that more than one EXU 210 may be assigned to a given thread. In some embodiments, one or more instances of IRF 400 may be shared by multiple EXUs 210.

Each instance of SL execution logic 410a-b may be configured to execute shorter-latency instructions. For example, in one embodiment EXUs 210 may be configured to execute simple integer non-load/store instructions (e.g., excluding integer multiply, divide, multiply step, population count, or other instructions defined as longer-latency, complex instructions). In such an embodiment, SL execution logic 410 may include an arithmetic logic unit (ALU) or another logic unit configured to perform simple integer arithmetic, shift, and/or Boolean instructions. In the illustrated embodiment, EXUs 210 may be configured to execute shorter-latency instructions in a single execution cycle, although in other embodiments execution may complete in a different number of cycles.

LL execution logic 420 may in turn be configured to execute longer-latency instructions, such as integer multiply, multiply step, population count, and/or other instructions defined as longer-latency instructions not executable by EXUs 210. In one embodiment FGU 220 may include a multiplier configured to perform multiplication of single- and/or double-precision mantissas. In one such embodiment, LL execution logic 420 may include such a multiplier as well as additional logic necessary to configure the multiplier to perform integer multiplication (such as signed or unsigned integer multiplication). In some embodiments, LL execution logic 420 may be configured to share other logic implemented within FGU 220 to perform other floating-point or graphics-related functions. Where such sharing is not feasible or desirable, LL execution logic 420 may implement logic dedicated to the execution of the implemented longer-latency instructions. In some embodiments, FGU 220 may be configured to pipeline the execution of longer-latency instructions. That is, FGU 220 may be configured to begin execution of a new longer-latency (or another FGU instruction, such as a floating-point or graphics instruction) before a previously-issued longer-latency instruction has completed execution. For example, in some embodiments each longer-latency instruction may take five execution cycles within FGU 220 to execute, while FGU 220 may be configured to begin execution of a new longer-latency instruction every execution cycle or every other execution cycle.

In the illustrated embodiment, each IRF 400 includes two independent read ports designated R1 and R2 as well as two independent write ports designated W1 and W2. Read ports R1 and R2 may be configured to concurrently read operands from register file state of the thread corresponding to a given instruction. For example, in one embodiment EXU0 210a may receive an integer instruction from thread 2 that specifies one or two register operand sources. Responsively, IRF 400a may be configured to read the specified sources and convey them to SL execution logic 410a if the instruction is a shorter-latency instruction, or to FGU 220 if the instruction is a longer-latency instruction. (In some pipelined embodiments, it is contemplated that a given instruction may depend on recently produced results not yet written back to a register file at the time the given instruction executes. In some such embodiments, EXUs 210 and/or FGU 220 may provide bypass logic to make such results available to the given instruction as operands.)

Similarly, write ports W1 and W2 may be configured to concurrently write results of instruction execution into register file state of the thread corresponding to the executed instruction. In the illustrated embodiment, port W1 is shared by all integer results produced from SL execution logic 410 and LL execution logic 420, while port W2 is dedicated to a load result (whether load hit or load miss) that may be returned via load store unit 230, for example. In other embodiments, write ports may be allocated differently. For example, in one embodiment, port W1 may be dedicated to results are produced within a fixed number of cycles after instruction issue, while port W2 may be dedicated to results that are produced a variable number of cycles after instruction issue (e.g., load miss results, integer divide results). Also, in other embodiments, a different number of read and/or write ports may be provided by IRF 400, and the various ports may be assigned to send or receive results to or from different types of functional units.

Figure 5:
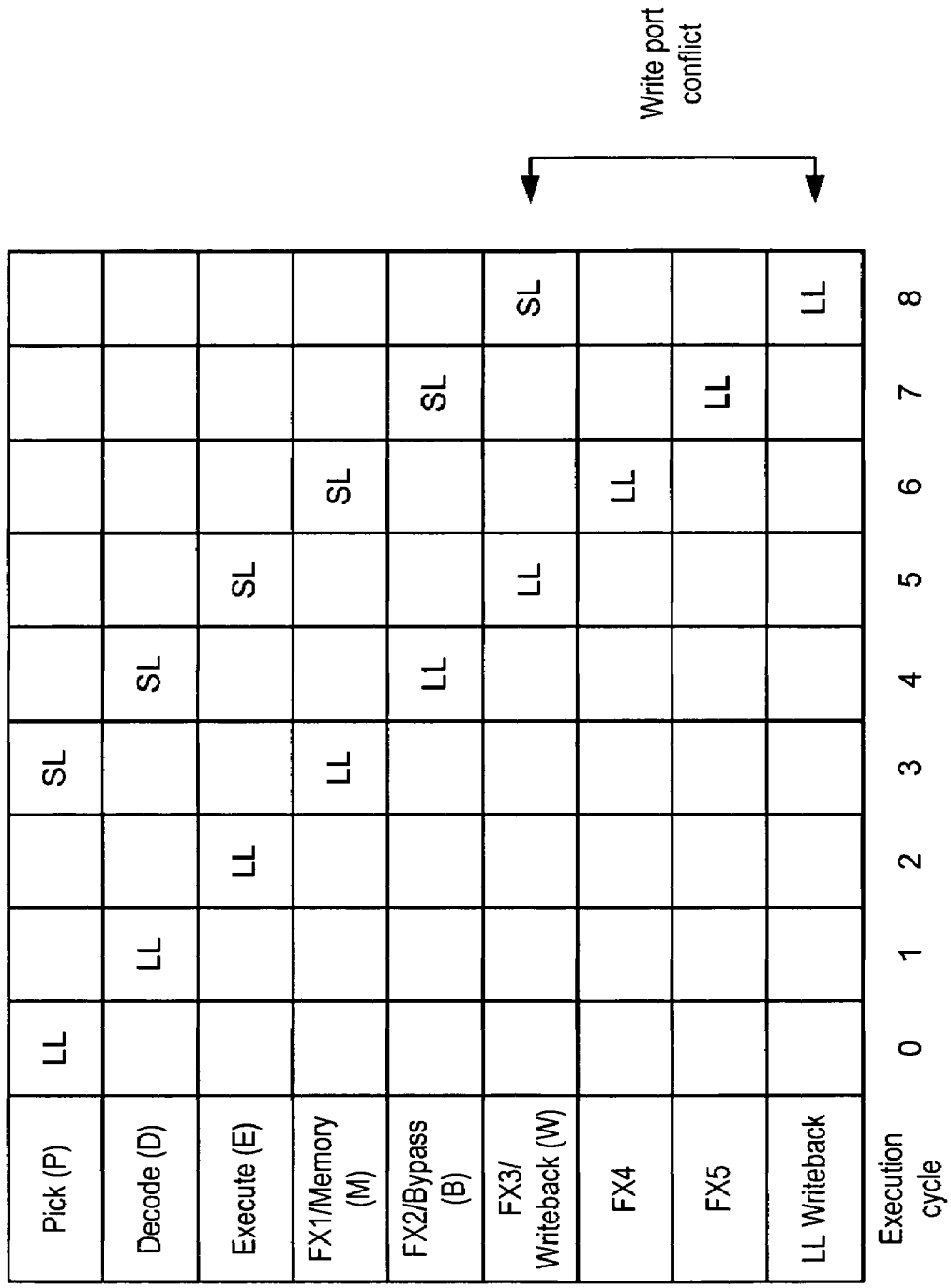
FIG. 5 is a pipeline diagram illustrating one embodiment of a write hazard.

Allowing SL execution logic 410 and LL execution logic 420 to share a single port W1 may simplify design and implementation of IRF 400, for example by reducing area requirements. However, because instructions executing in these units have different execution latencies, a write hazard (i.e., a conflict) may exist on shared port W1. One example of such a hazard is illustrated in the pipeline diagram illustrated in FIG. 5. In the illustrated embodiment, only those execution stages following the Pick stage are illustrated for clarity, although it is understood that instructions may pass through stages preceding the Pick stage such as the Fetch and Cache stages illustrated in FIG. 3.

In the illustrated pipeline embodiment, shorter-latency instructions pass through a single Execute stage within one of execution units 210, and enter the Writeback stage three execution cycles later (after passing through the Memory and Bypass stages). Longer-latency instructions pass through the Execute stage and enter the Writeback stage six execution cycles later (after passing through five additional execution stages, FX1-FX5, within FGU 220). Thus, in the illustrated embodiment, a shorter-latency instruction that issues three execution cycles following a longer-latency instruction will enter the Writeback stage during the same cycle as the longer-latency instruction. That is, the Writeback stage of the shorter-latency instruction collides with the Writeback stage of the longer-latency instruction. (In other embodiments, it is contemplated that the shorter-latency and longer-latency execution pipelines may be of arbitrary length, and that the collision may occur after a different number of execution cycles, depending on the difference in length of the pipelines. More complicated collision scenarios are also contemplated, for example in embodiments having three or more execution pipelines sharing a given result write port.)

In one embodiment, a potential collision between the Writeback stages of shorter-latency and longer-latency instructions may be avoided by blocking issue of a shorter-latency instruction that may collide with a longer-latency instruction. Specifically, in one embodiment IFU 200 may be configured to prevent the issue of a shorter-latency instruction during an execution cycle for which a subsequent Writeback stage collision may occur. For example, IFU 200 may be configured to prevent decode unit 208 from issuing a shorter-latency instruction during a Decode pipeline stage that occurs a given number of cycles after a longer-latency instruction has been decoded and issued, thereby inserting a "bubble" or "hole" into the pipeline and guaranteeing that the longer-latency instruction will have access to the result write port W1 during its Writeback stage. In FIG. 6, a pipeline diagram illustrating one embodiment of bubble insertion is shown. In the illustrated embodiment, a shorter-latency instruction entering the Decode stage during execution cycle 4 would conflict with a longer-latency instruction issued three cycles earlier. The shorter-latency instruction is held at the Decode stage for one cycle, creating the bubble shown in the pipeline and guaranteeing no write port conflict will occur in cycle 8 when the longer-latency instruction enters its Writeback stage. In other embodiments, it is contemplated that issue prevention (i.e., bubble insertion) may occur at any suitable pipeline stage, such as the Pick stage, for example. Further, it is contemplated that in some embodiments, a shorter-latency instruction held at issue to create a bubble may be held for more than one cycle, or may be cancelled.

As described above, in some embodiments the threads executed by core 100 may be divided into two or more thread groups. In some such embodiments, result write ports may be provided on a per-thread-group basis. For example, as shown in the embodiment of FIG. 4, each of IRFs 400a-b respectively associated with thread groups 0 and 1 has a respective instance of write port W1. In such an embodiment, a longer-latency instruction executing within FGU 220 may be configured to write back to one of IRFs 400a-b, but not the other. Thus during a given execution cycle, a write port hazard may apply only to a single thread group. In one such embodiment, following issuance of a longer-latency instruction corresponding to a given thread group, IFU 200 may be configured to stall (i.e., prevent instruction issue from) all threads within that given thread group during a subsequent issue execution cycle for which a Writeback stage collision may occur, while allowing an instruction to issue from a thread group other than the given thread group during that same issue execution cycle. For example, referring to FIG. 5, if the LL instruction in the Decode stage at cycle 1 corresponds to thread group 0, IFU 200 may be configured to prevent any instructions corresponding to thread group 0 from issuing from the Decode stage at cycle 4. At the same time, IFU 200 may freely allow one or more instructions from thread group 1 to be issued from the Decode stage at cycle 4 (subject to other issue constraints, in some embodiments).

Figure 9:
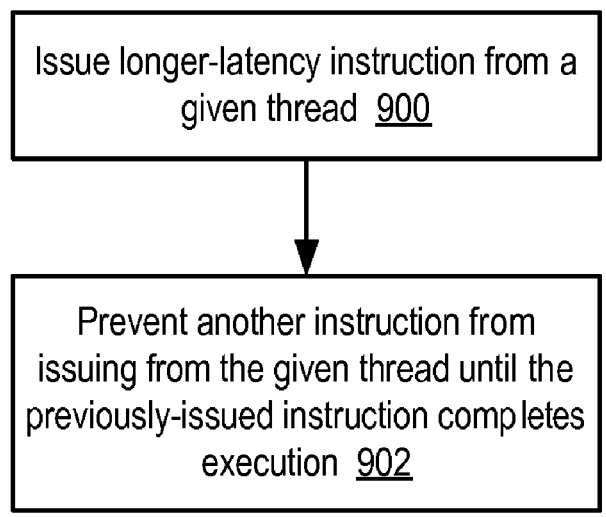
FIG. 9 is a flow diagram illustrating one embodiment of operation of instruction fetch logic of a fine-grained multithreaded processor core.

In one embodiment, a given thread that issues a longer-latency instruction to FGU 220 for execution may stall until that longer-latency instruction completes execution and writes back a result. For example, as shown in FIG. 9, in one embodiment IFU 200 may be configured to issue a longer-latency instruction from a given thread (block 900) and to prevent another instruction from issuing from the given thread until the previously-issued longer-latency instruction completes execution (block 902). However, in some such embodiments, longer-latency instructions may be pipelined across threads, such that any thread other than the given thread may be allowed to issue another longer-latency instruction as early as one cycle following the previously-issued longer-latency instruction from the given thread. Also, it is noted that by guaranteeing that a given longer-latency instruction has write port access during its Writeback stage, such as through the bubble-insertion technique just described, longer-latency instructions may not stall FGU 220 waiting for write port access, thus potentially improving overall thread processing throughput.

Figure 7:
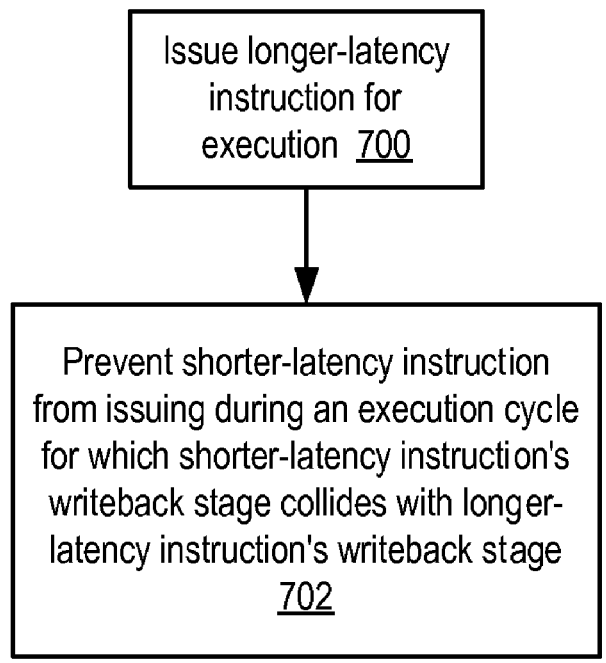
FIG. 7 is a flow diagram illustrating the operation of one embodiment of a method of pipelining differing-latency instructions in a fine-grained multithreaded core.

One embodiment of a method of pipelining differing-latency instructions in a fine-grained multithreaded core such as core 100 (i.e., a core configured to issue one instruction from one of a plurality of threads during one execution cycle and to issue another instruction from another of the plurality of threads during a successive execution cycle) is illustrated in FIG. 7. Referring collectively to FIG. 1 through FIG. 7, operation begins in block 700 where a longer-latency instruction is issued for execution. In one embodiment, the result of the longer-latency instruction may be written during a writeback pipeline stage that occurs a given number of execution cycles after the longer-latency instruction is issued.

Subsequent to issue of the longer-latency instruction, a shorter-latency instruction is prevented from issuing during an execution cycle for which its result writeback pipeline stage collides with the writeback pipeline stage of the longer-latency instruction (block 702). In one embodiment, the result of the shorter-latency instruction may be written during a writeback pipeline stage that occurs a fewer number of execution cycles after issue than for the longer-latency instruction.

Exemplary System Embodiment

Figure 8:
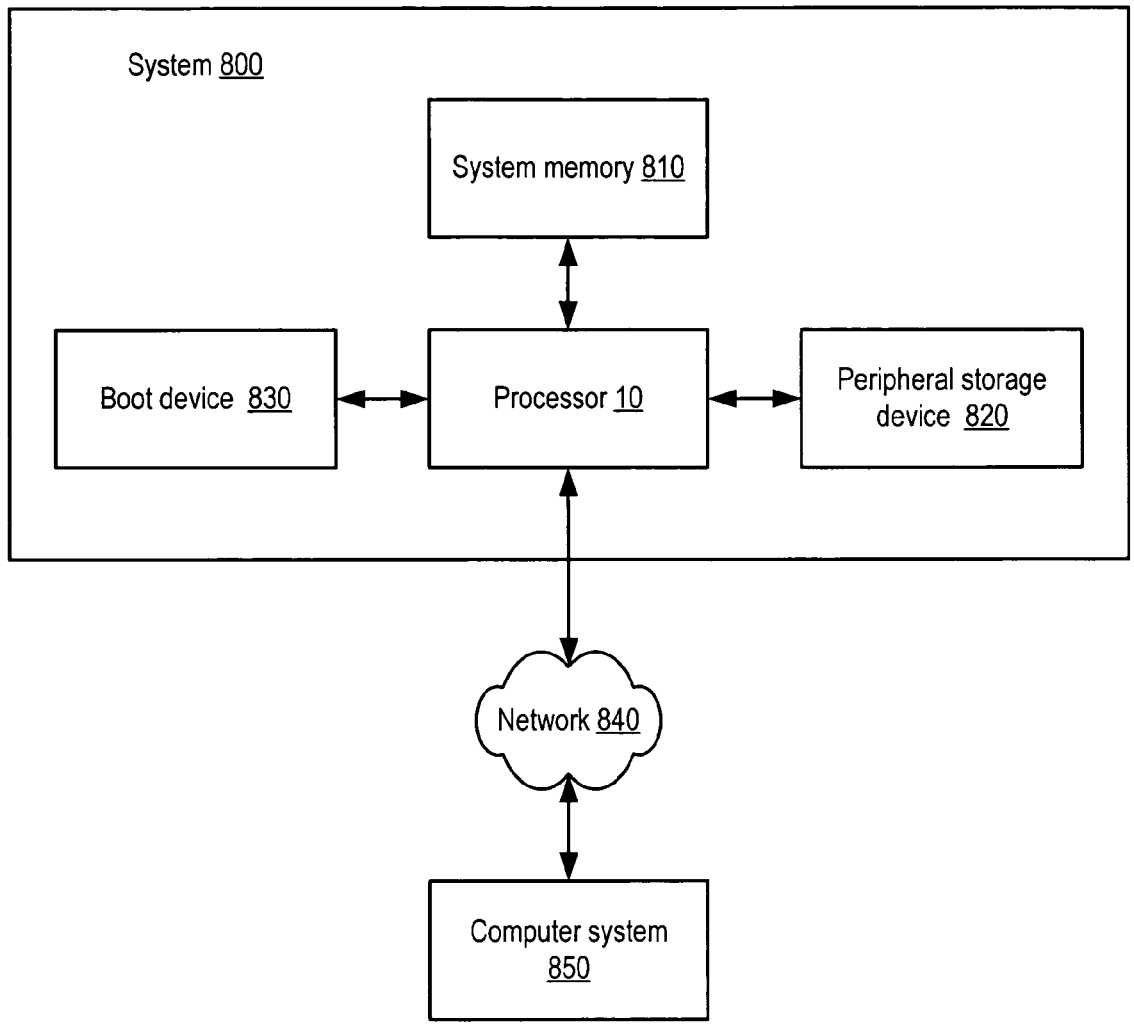
FIG. 8 is a block diagram illustrating one embodiment of a system including a multithreaded processor.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   instruction fetch logic configured to issue a first instruction from one of a plurality of threads during one execution cycle and to issue a second instruction from another one of said plurality of threads during a successive execution cycle, wherein each of said plurality of threads is assigned to a corresponding one of a plurality of thread groups, and wherein each of said plurality of thread groups includes at least two of said plurality of threads;

a first execution unit configured to execute a shorter-latency instruction and to write a result of said shorter-latency instruction to a result write port during a first writeback stage that occurs a first number of execution cycles after issue of said shorter-latency instruction; and a second execution unit configured to execute a longer-latency instruction and to write a result of said longer-latency instruction to said result write port during a second writeback stage that occurs a second number of execution cycles after issue of said longer-latency instruction, wherein said second number is greater than said first number, and wherein said longer-latency instruction corresponds to a particular one of said plurality of thread groups;

wherein said instruction fetch logic is further configured to guarantee access by said second execution unit to write said result of said longer-latency instruction to said result write port during said second writeback stage by preventing issue of any other instruction corresponding to said particular thread group during an execution cycle for which said first writeback stage collides with said second writeback stage; and wherein said instruction fetch logic is further configured to issue an instruction corresponding to a thread group other than said particular thread group during an execution cycle for which said first writeback stage collides with said second writeback stage.

2. The processor as recited in claim 1, wherein said second execution unit is further configured to execute another instruction subsequent to said longer-latency instruction without stalling.

3. The processor as recited in claim 1, wherein said instruction fetch logic is further configured to issue said longer-latency instruction from a given thread and to prevent issue of another instruction from said given thread until said longer-latency instruction completes execution.

4. The processor as recited in claim 3, wherein subsequent to issuing said longer-latency instruction from said given thread, said instruction fetch logic is further configured to issue an instruction from a thread other than said given thread.

5. The processor as recited in claim 1, wherein said longer-latency instruction comprises an integer instruction and wherein said second execution unit is configured to execute floating-point instructions.

6. The processor as recited in claim 1, wherein said longer-latency instruction comprises an integer multiply instruction, a population count instruction, or an integer multiply step instruction.

7. A method, comprising:
issuing a first instruction from one of a plurality of threads during one execution cycle, wherein each of said plurality of threads is assigned to a corresponding one of a plurality of thread groups, and wherein each of said plurality of thread groups includes at least two of said plurality of threads;

issuing a second instruction from another one of said plurality of threads during a successive execution cycle;

writing a result of a shorter-latency instruction to a result write port during a first writeback stage that occurs a first number of execution cycles after issuing said shorter-latency instruction;

writing a result of a longer-latency instruction to said result write port during a second writeback stage that occurs a second number of execution cycles after issuing said longer-latency instruction, wherein said second number is greater than said first number, and wherein said longer-latency instruction corresponds to a particular one of said plurality of thread groups;

preventing issue of any instruction corresponding to said particular thread group other than said longer-latency instruction during an execution cycle for which said first writeback stage collides with said second writeback stage; and issuing an instruction corresponding to a thread group other than said particular thread group during an execution cycle for which said first writeback stage collides with said second writeback stage.

8. The method as recited in claim 7, further comprising issuing another instruction for execution subsequent to said longer-latency instruction without stalling.

9. The method as recited in claim 7, further comprising:
issuing said longer-latency instruction from a given thread; and preventing issue of another instruction from said given thread until said longer-latency instruction completes execution.

10. The method as recited in claim 9, further comprising issuing an instruction from a thread other than said given thread subsequent to issuing said longer-latency instruction from said given thread.

11. The method as recited in claim 7, wherein said shorter-latency and said longer-latency instruction each comprises an integer instruction, and wherein said longer-latency instruction is configured to be executed in a floating-point execution unit.

12. The method as recited in claim 7, wherein said longer-latency instruction comprises an integer multiply instruction, a population count instruction, or an integer multiply step instruction.

13. A system, comprising:
a system memory; and
a processor coupled to said system memory, wherein said processor comprises:
instruction fetch logic configured to issue a first instruction from one of a plurality of threads during one execution cycle and to issue a second instruction from another one of said plurality of threads during a successive execution cycle, wherein each of said plurality of threads is assigned to a corresponding one of a plurality of thread groups, and wherein each of said plurality of thread groups includes at least two of said plurality of threads;

a first execution unit configured to execute a shorter-latency instruction and to write a result of said shorter-latency instruction to a result write port during a first writeback stage that occurs a first number of execution cycles after issue of said shorter-latency instruction; and a second execution unit configured to execute a longer-latency instruction and to write a result of said longer-latency instruction to said result write port during a second writeback stage that occurs a second number of execution cycles after issue of said longer-latency instruction, wherein said second number is greater than said first number, and wherein said longer-latency instruction corresponds to a particular one of said plurality of thread groups;

wherein said instruction fetch logic is further configured to guarantee access by said second execution unit to write said result of said longer-latency instruction to said result write port during said second writeback stage by preventing issue of any other instruction corresponding to said particular thread group during an execution cycle for which said first writeback stage collides with said second writeback stage; and wherein said instruction fetch logic is further configured to issue an instruction corresponding to a thread group other than said particular thread group during an execution cycle for which said first writeback stage collides with said second writeback stage.

14. The system as recited in claim 13, wherein said second execution unit is further configured to execute another instruction subsequent to said longer-latency instruction without stalling.

15. The system as recited in claim 13, wherein said instruction fetch logic is further configured to issue said longer-latency instruction from a given thread and to prevent issue of another instruction from said given thread until said longer-latency instruction completes execution.

16. The system as recited in claim 15, wherein subsequent to issuing said longer-latency instruction from said given thread, said instruction fetch logic is further configured to issue an instruction from a thread other than said given thread.

17. The system as recited in claim 13, wherein said longer-latency instruction comprises an integer instruction and wherein said second execution unit is configured to execute floating-point instructions.

18. The system as recited in claim 13, wherein said longer-latency instruction comprises an integer multiply instruction, a population count instruction, or an integer multiply step instruction.

* * * * *